United States Patent
Downey et al.

(10) Patent No.: US 10,025,307 B2
(45) Date of Patent: Jul. 17, 2018

(54) MODULAR FLIGHT MANAGEMENT SYSTEM INCORPORATING AN AUTOPILOT

(71) Applicant: Unmanned Innovation, Inc., San Francisco, CA (US)

(72) Inventors: Jonathan B. Downey, San Francisco, CA (US); Bernard J. Michini, San Francisco, CA (US)

(73) Assignee: Unmanned Innovation, Inc., San Francisco, CA (US)

( * ) Notice: Subject to any disclaimer, the term of this patent is extended or adjusted under 35 U.S.C. 154(b) by 0 days.

(21) Appl. No.: 14/990,408

(22) Filed: Jan. 7, 2016

(65) Prior Publication Data

US 2016/0187882 A1 Jun. 30, 2016

Related U.S. Application Data

(63) Continuation of application No. 13/587,092, filed on Aug. 16, 2012, now Pat. No. 9,250,630.
(Continued)

(51) Int. Cl.
*G05D 1/00* (2006.01)
*G05D 1/08* (2006.01)
(Continued)

(52) U.S. Cl.
CPC .......... *G05D 1/0088* (2013.01); *B64C 39/024* (2013.01); *G05D 1/0055* (2013.01);
(Continued)

(58) Field of Classification Search
CPC ........ G05D 1/0094; G05D 1/08; G05D 1/101; G06F 21/44; H05K 3/32; Y10T 29/4913;
(Continued)

(56) References Cited

U.S. PATENT DOCUMENTS 4,327,437 A * 4/1982 Frosch ............... G11B 3/08516
244/194
5,455,911 A * 10/1995 Johansson ............. G06F 13/423
700/1
(Continued)

FOREIGN PATENT DOCUMENTS

EP 0758972 A1 12/1997
EP 1677172 A2 7/2006
(Continued)

OTHER PUBLICATIONS

Alvis et al., FPGA Based Flexible Autopilot Platform for Unmanned Systems, IEEE, 2007 Mediterranean Conference on Control and Automation, Jul. 27-29, 2007, pp. 1-9.*
(Continued)

*Primary Examiner* — Thomas G Black
*Assistant Examiner* — Sze-Hon Kong
(74) *Attorney, Agent, or Firm* — Knobbe Martens Olson & Bear LLP

(57) ABSTRACT

A modular vehicle management system is described, comprising a controller module configured to control different types of carrier modules. The controller module includes a computer system and optionally one or more sensors. The computer system is configured to perform operations comprising detecting whether a carrier module is connected to the controller module. If the carrier module is connected to the controller module, the carrier module is authenticated. If the authentication fails, operation of the vehicle is inhibited. The control module is configured to determine carrier module capabilities including information regarding a navigation processing device, and/or a radio modem. The controller adapts to the capabilities of the controller module. Using information from the sensors and the navigation processing
(Continued)

device, the vehicle management system navigates the vehicle.

28 Claims, 6 Drawing Sheets

Related U.S. Application Data

(60) Provisional application No. 61/524,319, filed on Aug. 16, 2011.

(51) Int. Cl.
| | |
|---|---|
| *H05K 3/32* | (2006.01) |
| *B64C 39/02* | (2006.01) |
| *G05D 1/10* | (2006.01) |
| *G06F 21/44* | (2013.01) |

(52) U.S. Cl.
CPC ......... *G05D 1/0077* (2013.01); *G05D 1/0094* (2013.01); *G05D 1/08* (2013.01); *G05D 1/101* (2013.01); *G06F 21/44* (2013.01); *H05K 3/32* (2013.01); *B64C 2201/127* (2013.01); *B64C 2201/141* (2013.01); *B64C 2201/145* (2013.01); *Y10T 29/4913* (2015.01)

(58) Field of Classification Search
CPC ........ B64C 2201/127; B64C 2201/141; B64C 2201/145
See application file for complete search history.

(56) References Cited

U.S. PATENT DOCUMENTS

| | | | |
|---|---|---|---|
| 5,550,736 A | 8/1996 | Hay et al. | |
| 6,289,467 B1 | 9/2001 | Lewis et al. | |
| 6,497,388 B1 | 12/2002 | Friend et al. | |
| 6,522,867 B1 | 2/2003 | Wright et al. | |
| 6,665,594 B1 | 12/2003 | Armstrong | |
| 7,047,440 B1* | 5/2006 | Freydel | G05B 19/0428 714/10 |
| 7,093,798 B2 | 8/2006 | Whelan et al. | |
| 7,762,496 B2 | 7/2010 | Seiersen et al. | |
| 7,860,582 B2* | 12/2010 | Ghercioiu | G06F 1/183 361/724 |
| 7,877,627 B1* | 1/2011 | Freydel | G06F 11/1633 714/11 |
| 7,938,362 B2 | 5/2011 | Kismarton et al. | |
| 7,996,714 B2* | 8/2011 | O'Connell | G06F 11/182 714/11 |
| 8,100,362 B2 | 1/2012 | Guering | |
| 8,256,715 B2 | 9/2012 | Ballard et al. | |
| 8,260,479 B2 | 9/2012 | Christenson et al. | |
| 8,308,108 B2 | 11/2012 | Cazals et al. | |
| 8,360,362 B2 | 1/2013 | Kismarton et al. | |
| 8,751,144 B2 | 6/2014 | Tzao et al. | |
| 8,874,283 B1 | 10/2014 | Cavote | |
| 8,880,241 B2 | 11/2014 | Mohamadi | |
| 8,903,568 B1 | 12/2014 | Wang et al. | |
| 8,938,160 B2 | 1/2015 | Wang | |
| 2002/0133240 A1* | 9/2002 | Nagao | G06F 9/4411 700/9 |
| 2003/0065428 A1 | 4/2003 | Mendelson et al. | |
| 2003/0093187 A1 | 5/2003 | Walker | |
| 2003/0130791 A1* | 7/2003 | McIntyre | G05D 1/0077 701/472 |
| 2003/0193571 A1* | 10/2003 | Schultz | H04N 5/23203 348/207.99 |
| 2004/0215841 A1* | 10/2004 | Yamada | G06F 13/4095 710/5 |
| 2005/0218260 A1* | 10/2005 | Corder | B64C 3/56 244/49 |
| 2005/0289274 A1* | 12/2005 | Ghercioiu | G06F 8/51 710/303 |
| 2006/0155425 A1 | 7/2006 | Howlett et al. | |
| 2006/0262781 A1 | 11/2006 | Campini et al. | |
| 2007/0018036 A1* | 1/2007 | Stephenson | B64G 1/14 244/36 |
| 2007/0033511 A1* | 2/2007 | Davies | G06F 11/1675 714/799 |
| 2007/0069083 A1* | 3/2007 | Shams | G05D 1/101 244/195 |
| 2007/0162669 A1* | 7/2007 | Martin | G06F 13/387 710/72 |
| 2007/0266192 A1 | 11/2007 | Campini et al. | |
| 2008/0007928 A1* | 1/2008 | Salama | G06F 15/7835 361/784 |
| 2008/0046121 A1* | 2/2008 | Pao | B25J 9/1617 700/245 |
| 2008/0174448 A1* | 7/2008 | Hudson | A63H 30/04 340/4.37 |
| 2008/0178463 A1 | 7/2008 | Okubora | |
| 2008/0210809 A1 | 9/2008 | Ariton et al. | |
| 2008/0284118 A1* | 11/2008 | Venton-Walters | B60G 3/14 280/6.154 |
| 2008/0307143 A1* | 12/2008 | Lin | G06F 13/385 710/302 |
| 2009/0087029 A1 | 4/2009 | Coleman et al. | |
| 2009/0114764 A1 | 5/2009 | Builta et al. | |
| 2010/0030509 A1* | 2/2010 | Crain, II | G06F 19/00 702/123 |
| 2010/0049987 A1 | 2/2010 | Ettorre et al. | |
| 2010/0145556 A1 | 6/2010 | Christenson et al. | |
| 2010/0155611 A1 | 6/2010 | Fullwood et al. | |
| 2010/0168937 A1 | 7/2010 | Soijer et al. | |
| 2010/0201806 A1 | 8/2010 | Nygaard et al. | |
| 2010/0235032 A1 | 9/2010 | Sung et al. | |
| 2011/0022770 A1 | 1/2011 | Sullivan | |
| 2011/0180656 A1* | 7/2011 | Shue | G05D 1/0077 244/17.13 |
| 2011/0264834 A1* | 10/2011 | Fletcher | H03K 19/017581 710/104 |
| 2011/0301784 A1 | 12/2011 | Oakley et al. | |
| 2012/0035787 A1* | 2/2012 | Dunkelberger | B64C 39/024 701/3 |
| 2012/0044710 A1 | 2/2012 | Jones | |
| 2012/0104517 A1 | 5/2012 | Huang et al. | |
| 2012/0131353 A1* | 5/2012 | Nasir | G06F 21/42 713/189 |
| 2012/0232722 A1 | 9/2012 | Fisher et al. | |
| 2012/0233447 A1* | 9/2012 | Fitzgerald | G06F 8/36 713/1 |
| 2012/0253555 A1 | 10/2012 | Stange | |
| 2012/0290164 A1* | 11/2012 | Hanson | B60F 5/00 701/23 |
| 2014/0316615 A1* | 10/2014 | Shue | G05D 1/0077 701/3 |
| 2014/0325644 A1 | 10/2014 | Oberg et al. | |
| 2015/0237424 A1* | 8/2015 | Wilker | H04R 1/026 381/150 |
| 2015/0370252 A1* | 12/2015 | Hanson | B63B 1/042 701/2 |
| 2016/0205814 A1* | 7/2016 | Burke | H05K 9/0007 174/377 |
| 2017/0178352 A1* | 6/2017 | Harmsen | G06T 7/579 |

FOREIGN PATENT DOCUMENTS

| | | |
|---|---|---|
| EP | 2156216 A1 | 2/2010 |
| EP | 2212199 A1 | 8/2010 |
| JP | 06-195125 A | 7/1994 |
| JP | 08-048297 A | 2/1996 |

OTHER PUBLICATIONS

Barragan, Wiring: Prototyping Physical Interaction Design, Interactive Design Institute Ivrea, Jun. 2004, pp. 1-43.*
Pastor et al., A Hardware/Software Architecture for UAV Payload and Mission Control, IEEE, 2006, 25th Digital Avionics Systems Conference, Oct. 15, 2006, pp. 5B4-1-5B4-8.*

(56) References Cited

OTHER PUBLICATIONS

Johnson et al., Software Enabled Control Experiments with University-Operated Unmanned Aircraft, American Institute of Aeronautics and Astronautics, Inc., Sep. 26-29, 2005, 9 pages.*
Johnson et al., The Georgia Tech Unmanned Aerial Research Vehicle: GTMax, American Institute of Aeronautics and Astronautics, Inc., Aug. 11-14, 2003, 10 pages.*
Australian Office Action dated Feb. 2, 2016 regarding Patent Application No. 2012321338, 4 pages.
Extended European Search Report dated Jul. 30, 2015, regarding Application No. EP 12 83 9320, 5 pages.
International Search Report and Written Opinion dated May 30, 2013 for International Application No. PCT/US2013/051227.

* cited by examiner

MODULAR FLIGHT MANAGEMENT SYSTEM INCORPORATING AN AUTOPILOT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 CFR 1.57.

BACKGROUND OF THE INVENTION

Field of the Invention

The present invention is related to vehicle guidance systems.

Description of the Related Art

Unmanned aerial vehicles (UAV) are often physically small, with little room available for electronic systems, such as flight management systems and navigation systems. In an attempt to accommodate the small volume available for the flight management systems and navigation systems, one conventional approach has been to integrate all of the components of the autopilot with the components of the flight management system in a single integrated package to reduce weight, size, wiring, and required connectors.

While closely integrating the components of the autopilot and flight management system may yield a small size and minimal cabling, it may also greatly decrease flexibility in terms of aircraft supported, payloads supported, power conditioning provided and physical and electronic interfaces to other aircraft components. As a result, a given flight management system is conventionally designed to support a narrow class of aircraft with similar volume, weight, and power availability for the flight management system and for payloads, and with very similar missions and payloads.

SUMMARY OF THE INVENTION

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Described herein are embodiments of a modular vehicle management system which may include an autopilot, sensors, radios, and other such functions, configured to automatically pilot a vehicle. For example, the vehicle may be a manned or unmanned air, space, sea, or land vehicle. The modular vehicle management system may be used to determine the vehicle's current location, velocity and/or attitude and to pilot the vehicle along a specified route and/or to a specified location. For example, the modular vehicle management system may control actuators or propulsion devices to direct the vehicle's movement. The vehicle management system may include one or more controller modules, sometimes referred to herein as a core module, and one or more peripheral modules, sometimes referred to herein as a carrier module. Certain embodiments include a single controller module and a single carrier module.

Different types of peripheral modules may be configured with different capabilities, input power specifications, form factors, weight, shielding, physical interfaces and/or electrical interfaces (e.g., connectors, ports, drivers, etc.). For example, the capabilities may differ with respect to one or more of the following functions: regulated available output power, payload interfaces, radio transceivers, navigation devices, redundancy, supplementary or additional host computers, etc.

An example embodiment provides a modular flight management system for an unmanned vehicle, comprising: a controller board configured to control a plurality of different types of carrier modules, the controller board including at least: computer readable media, optionally storing an operating system; a computer system optionally configured to execute the operating system; a pressure sensor coupled to the computer system, a magnetometer coupled to the computer system, a MEMS (Micro-electromechanical systems) gyroscope coupled to the computer system; a MEMS (Micro-electromechanical systems) accelerometer coupled to the computer system; a connector configured to receive a carrier board; wherein the computer system is configured to perform operations comprising: detecting whether a carrier board is connected to the connector; at least partly in response to detecting that the carrier board is connected to the connector, authenticating the carrier board to determine whether the carrier board is authorized to be connected to the controller board, wherein if the carrier board fails authentication by the control board, operation of the vehicle is inhibited by the flight management system; determining capabilities of the carrier board to determine at least information regarding: a navigation satellite system signal processing device coupled to the carrier board, and a radio modem; adapting the operation of the controller board to the determined capabilities of the carrier board; accessing a desired location or route; receiving signals from the pressure sensor, the accelerometer, the magnetometer, the MEMS gyroscope, and the navigation satellite system signal processing device; based at least in part on the received signals, determining a location, an altitude, velocity, attitude and a heading of the vehicle and navigating the vehicle in accordance with the desired location or route. The modular flight management system may include an autopilot function.

An example embodiment provides a modular vehicle management system, comprising: a controller module configured to control a plurality of different types of carrier modules, the controller module including at least: a computer system; one or more sensors configured to provide at least one of acceleration information or/and gyroscopic based orientation information; a connector configured to receive a carrier module without a backplane; wherein the computer system is configured to perform operations comprising: detecting whether a carrier module is coupled to the controller module; determining capabilities of the carrier module to determine at least information regarding: a navigation satellite system signal processing device accessible via the carrier module, and/or a radio modem; adapting the operation of the controller module to the determined capabilities of the carrier module; accessing a desired location or route; based at least in part on information from the one or more sensors and the navigation satellite system signal processing device, navigating the vehicle in accordance with the desired location or route. The modular vehicle management system may include an autopilot function.

An example embodiment provides a method of assembling a flight management system, the method essentially consisting of: electrically connecting a controller circuit board, the controller circuit board including at least a processor and one or more sensors configured to provide at least one of acceleration information or gyroscopic based orientation information, and a connector configured to receive a carrier board, with a carrier board comprising a navigation satellite system signal processing device coupled to the carrier board, and a radio modem coupled to the carrier board; and mechanically coupling the controller circuit board and the carrier board, wherein the flight management system is configured to perform autopilot functions.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION OF PREFERRED EMBODIMENTS

Figure 1:
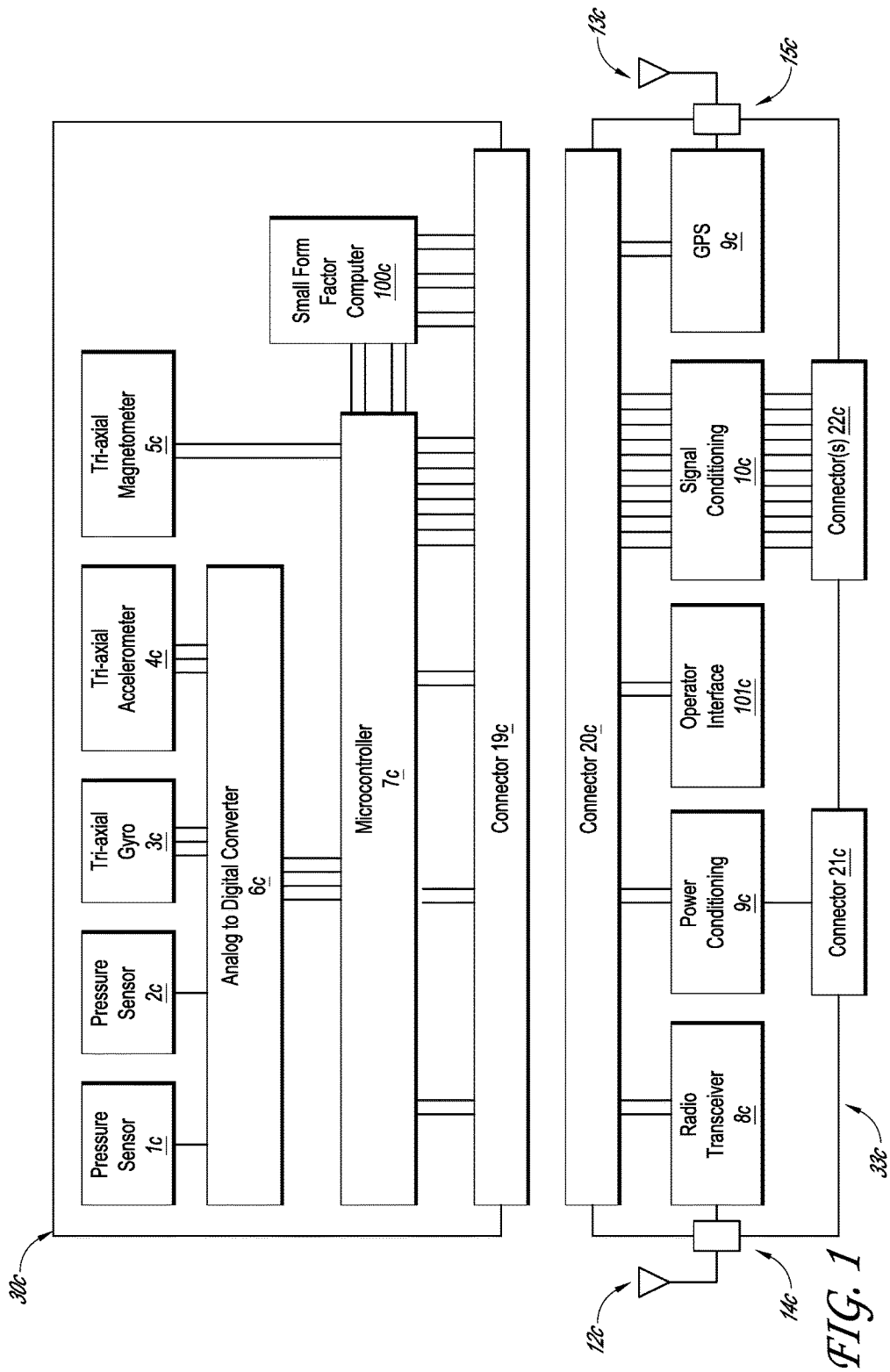
FIG. 1 illustrates an example modular vehicle management system.

Described herein are embodiments of a modular vehicle management system which may include an autopilot, sensors, radios, and other such functions, configured to automatically pilot a vehicle. For example, the vehicle may be a manned or unmanned air, space, sea, or land vehicle. The modular vehicle management system may be used to determine the vehicle's current location, attitude, velocity, altitude, and/or airspeed and to pilot the vehicle along a specified route and/or to a specified location and/or to control the vehicle's attitude, velocity, altitude, and/or airspeed (optionally even when not navigating the vehicle along a specific path or to a specific location). For example, the modular vehicle management system may control actuators and/or propulsion units to direct the vehicle's movement.

As noted above, in order to address the limited volume and weight allocations for systems in a UAV, conventional flight management systems emphasize a high level of integration of functions into a single module. Such conventional designs emphasize small size and weight, and sacrifice the flexibility to support a wider range of vehicles, payloads, and customer needs. By contrast, certain embodiments described herein can be flexibly configured for different vehicles, missions, payloads, and sensors.

The modular, adaptable vehicle management system may include a controller module, sometimes referred to herein as a core module, and one or more carrier modules.

The vehicle management system may provide an autopilot function, via the core module, that uses sensor data to estimate the current state (e.g., position, attitude (e.g., pitch, bank, and yaw), heading, altitude, airspeed, velocity etc.) of a vehicle. For example, the vehicle may be power-driven or a glide vehicle, it may be reusable, and may be manned or unmanned (operated without a human on board). The vehicle may be an aircraft, surface vessel, underwater vehicle, or ground vehicle.

The sensor data may include satellite signal data, radio signal data, camera data, pressure sensor data, gyroscope data, accelerometer data, magnetometer data, glideslope data, and/or other sensor data. The autopilot may perform computations to determine how to maintain or alter the vehicle's course, and control actuators (such as servo controlled actuators), and or propulsion units to control the vehicle's movement (e.g., by controlling the vehicle's wheels, propeller(s), elevator(s), rudder(s), aileron(s), swashplate(s), flap(s), motor speed(s), engine throttle setting(s), turbine speed(s), other flight control surface(s)). The vehicle management system may incorporate additional functionality (e.g., pointing a camera, focusing a camera, instructing the camera to captures images/videos, dispersing a liquid, dispersing chaff, operating an RF device, such as a radio or radar, etc.) to achieve mission goals in addition to vehicle course control.

When a vehicle management system, such as certain embodiments described herein, is used to control an aircraft, it is typically referred to as a flight management system. As noted above, the flight management system may include components in addition to the autopilot, such as a radio and/or other communication devices for communicating data and instructions with a control station, interfaces to other sensors, computers, or effectors related to the vehicle's mission, power regulation, and monitoring devices for the autopilot and the flight management system.

Different carrier modules may include respective different navigation devices. By way of illustration, a given navigation device may process location and time signals received from a space-based satellite navigation constellation. For example, the navigation device may be in the form of a GPS (global position satellite) navigation device or a specific version thereof, a Global Navigation Satellite System (GLONASS) navigation device or a specific version thereof, a Galileo positioning system navigation device or a specific version thereof, a Compass system navigation device, a Regional Navigational Satellite System (RNSS) navigation device or a specific version thereof, or other type of navigation device or versions thereof.

The carrier module may further include other components, such as a radio, actuator interfaces, sensor interfaces, user interfaces (e.g., speakers used to communicate with a vehicle operator, to audibly provide vehicle status, etc., and/or visual status indicators (e.g., LEDs. LCDs, etc.) used to provide vehicle status, (e.g., wherein visual or audible status may be presented when initializing the system, starting motors/propulsion units, entering an armed state, etc.), and/or input devices (e.g., switches, buttons, touch screens, etc.) to receive user inputs, etc. A given carrier module may include jumpers or other user accessible devices enabling a user to select which external components are to be coupled to the carrier module and/or which connector pin is to be connected to a carrier module circuit. For example, a jumper may be provided enabling the user to determine which servo unit is to be connected to servo power sourced or provided by the carrier module. A given carrier module may also include one or more temperature sensing circuits which may be connected to temperature sensors on the carrier module and/or the core module, configured to measure the temperature of the carrier module, the core module, and/or the interior of the flight management system enclosure. The temperature sensing circuits may be further coupled to a temperature sensor configured to measure the air temperature.

A module may be in the form of a circuit board, such as a printed circuit board, with electronic components soldered, socketed, or otherwise fixably or removably mounted thereto. In addition, a module may include one or more connectors to which other modules may plug into and/or to which one or more electrical or optical cables many plug in to. In certain embodiments, a motherboard is not used to connect certain or any modules together in order to reduce the size and weight of the vehicle management system. Instead one or more modules may be plugged directly into another module, and additional modules may be stacked on top, as will be further described below. Other embodiments may utilize a motherboard to interconnect modules.

Examples of different carrier modules are as follows. A first carrier module may be configured, in size, weight, and functions, for very small fixed-wing unmanned aerial vehicles. A second carrier module may be configured, in size, weight, and functions, for multi-rotor unmanned aerial vehicles. A third module may be configured, in size, weight, and functions, for larger fixed-wing and helicopter unmanned aerial vehicles needing relatively more regulated electrical power and more interfaces to payload electronics. A fourth module may be configured to be very low cost for disposable applications (e.g., single use applications) and incorporate the minimum interfaces required for flight. A fifth module may be configured to interface with two or more core modules, enabling redundant flight control. A sixth module may be configured with a relatively larger and higher performance computer with interfaces enabling image processing and video compression on the Flight Management System. Each of the foregoing carrier modules may be plugged into the same core module type.

Thus, combining the same core module with different carrier modules enables a wide variety of unmanned aircraft with differing sizes, operational ranges, payloads, and power requirements to be controlled without requiring a complete new flight management to be designed and fabricated. Similarly, such modular combinations of a core module, containing the electronics and functionality common to multiple vehicle and/or payload types, and appropriate carrier module, containing the electronics and functionality designed for a specific class of vehicle and/or payload, may also be used to perform similar functions in ground vehicles, surface vehicles, submersible vehicles, and space vehicles.

A manufacturer, distributor, or operator may keep a stock of core modules and a stock of different types of carrier modules. Then, as needed, a core module and a user selected carrier module appropriate for a particular vehicle or mission may be withdrawn from stock as needed, quickly combined by plugging the carrier module and the core module together, and installing the combined carrier module and core module into the vehicle as a unit. Further, utilizing the same core module configuration for a large number of applications enables larger quantities of the core module configuration to be manufactured and calibrated within a period of time, thereby reducing manufacturing and component costs on a per unit basis.

As discussed above, an example core module includes electronics and functionality common to multiple vehicle and/or payload types. In order to provide such cross-platform and payload functionality, the example core module may include some of all of the following functions and devices:
    an air attitude heading reference system (AAHRS) including sensors on three axes that provide heading, attitude, and dynamic and static pressures for the vehicle;
    a controller (e.g., an embedded microcontroller or a microprocessor);
    a small form-factor computing system hosting an operating system (e.g., a Linux operating system);
    a connector configured to connect to a carrier module/board.

In an example embodiment, the core module interfaces to the carrier board via a single (or more than one) electrical connector and multiple (e.g., four) mounting stand-offs. In order to provide tight packaging with a very low profile, the total standoff distance between the core module and the carrier module may be in the range of 1 mm to 10 mm, 2 mm-8 mm, 3 mm-7 mm, and in certain embodiments, 7 mm (to ensure adequate component clearance and airflow, while reducing the total volume of the combined core and carrier modules). The connector provides power to the core module and interfaces (e.g., via digital and/or analog signals) the controller and computing system with electronic hardware both on the carrier and connected to the carrier by additional connectors.

The core module may include a regulator (e.g., a linear voltage regulator) to regulate the voltage for the sensors in the AAHRS, which may include a multichannel Analog to Digital Converter (ADC). The regulator may be turned on or off by the computing system or controller to reset the AAHRS circuitry or to conserve power.

A tri-axial accelerometer measures accelerations of the system and vehicle. For example, certain embodiments may measure up to +/−12 g including gravity and outputs three analog voltages corresponding to acceleration in the X, Y, and Z directions (other embodiments may measure other ranges of acceleration). The analog voltage may be passed through a filter (e.g., a 25 Hz 2nd-order low pass analog filter, such as a 2 pole Butterworth filter) prior to being measured by the ADC. An input (e.g., a digital input) to the accelerometer (e.g., configured to receive a control signal from the computing system) can be used to select a smaller measurement range (e.g., a +/−4 g range) for greater resolution if needed. An additional digital input (e.g., configured to receive a control signal from the computing system) to the accelerometer can place the unit in a "self-test" state.

A tri-axial gyroscope (e.g., a MEMS (Micro-electromechanical systems) gyroscope) measures rotational speed of the device/vehicle about all three axes and provides respective outputs (e.g., three analog voltages) to enable the vehicle management system to measure or estimate the pitch/roll and yaw of the vehicle. In the embodiment utilizing analog output voltages, a given voltage is passed through an analog filter (e.g., a 25 Hz 2nd-order low pass analog filter, such as a 2 pole Butterworth filter) prior to being measured by the ADC to reduce aliasing of high frequency content. One or more of the gyros may include an internal temperature sensor having an output connected to the computing system (e.g., if the temperature sensor output is analog, connected to an analog input on the computing system) for temperature compensation calculations.

One, two, or more absolute and/or differential pressure sensors may be provided. A given absolute pressure sensor may have an analog output. For example, the analog output may provide a voltage that corresponds to a measured absolute pressure (e.g., a range of 0 volts and 3.0 volts corresponding to the absolute pressure measured between 2.2 and 16.7 psi). In an example embodiment, a voltage (e.g., one volt) is subtracted from each of these outputs using an operational amplifier and then each is passed through a filter (e.g., a 10 Hz 2nd-order low pass analog filter) before being amplified and then measured by the ADC. By signal conditioning the output voltage of the pressure sensors in this way, maximum or enhanced resolution can be obtained for altitudes of about −2,000 feet to 19,500 feet where many small UAVs fly. A pressure sensor may be configured to be connected to a probe, such as a static port of a Pitot-Static probe (which may be used to determine the vehicle's airspeed, altitude, and/or altitude trend by measuring pressures or pressure differences) while another pressure sensor may be connected to a dynamic pressure port. By calculating the pressure at each sensor and calculating the difference between the two, airspeed, altitude, and/or altitude trend, may be obtained.

The Analog to Digital Converter (ADC), sampling thousands, tens of thousands, or hundreds of thousands of times a second, converts the analog voltages from the gyro, accelerometer, and pressure sensors into digital readings. The ADC may be connected to the processor over a bus as a slave device. In other embodiments, the various sensors can include internal analog-to-digital converters which directly output digital signals.

A tri-axial magnetometer, used to measure the Earth's magnetic field, optionally including an internal ADC, is connected to the processor over an I2C (Inter IC) bus (or other bus type) as a slave device. The processor reads X, Y, and Z, gauss values from the magnetometer using the bus and may use such values to determine the vehicle's attitude.

The core module controller may include a hardware floating-point circuit, internal Flash and RAM memory, one or more peripheral interfaces (e.g., UART, I2C, SPI, USB, CAN2.0B, PWM (Pulse Width Modulation), analog inputs, etc.). A clock oscillator may provide a clock source for the controller. The controller may interface with the AAHRS over an SPI bus, an I2C bus, and logic lines to control the power supply, self-test mode, and accelerometer range.

One or more of the core module controller's interfaces are configured to be connected to one or more devices on a carrier board and/or to one or more payloads to be connected to the carrier board via the connector. Optionally, conductors between the controller and the connector are coupled to signal conditioning circuitry, such as bypass capacitors for the analog inputs, a capacitor and pull-up resistor for an input from a user operated switch or button, driver circuits for various ports (e.g., CAN2.0B (Controller Area Network) ports), and series resistors for the PWM ports.

Optionally, the controller includes programming and debug ports (e.g., JTAG and TRACE ports) which are connected to the core module connector.

The controller is configured to interrogate a given carrier board to determine the board/function/capabilities type and/or version that is connected to the core board (e.g., by use of a serial interface). The controller sends an encrypted interrogation serial command to a microcontroller or other device on a given carrier module, which decrypts the interrogation command and replies with an encrypted response indicating to the controller on the core module what type of carrier it is and what its capabilities are.

Optionally, the core module includes a display (e.g., a tri-color, red, green, blue LED) connected to the controller. The controller can pulse the power to a given color LED (e.g., using a pulse width modulator) to control which color is displayed to visibly indicate the status of the core module and/or the system as a whole to an operator. Other types of displays, such as dot matrix, seven segment, LCD displays, may be used.

The core module controller and computing system may communicate over one or more interfaces, such as a USB connection in which the controller is the "Device" and the computing system is the "Host." This connection allows for periodic or continuous bi-directional transfers of data. A USB mux is optionally connected between the controller and the computing system that can switch the "Host" to be an alternate USB connection. This alternate connection is routed to the core module connector such that when another USB host (e.g., a laptop, other computer, programmer, etc.) is connected, the computing system is disconnected from the controller and the controller is connected to the new host. This enables configuration of the controller and/or core module and/or the loading of new firmware by an alternate host, and once the new host is disconnected, for the on-board computing system to regain communication with the controller and act as the host.

As discussed above, the computing system may optionally be a small form factor computing system. The computing system may be coupled (fixedly or removably) as a sub-module to the core module via one or more connectors and mounting holes. The computing sub-module may be positioned between the PCB of the core module and the carrier board (e.g., within the 7 mm gap) such that it is protected and largely hidden and does not materially add to the total volume of the complete flight management system.

The controller is optionally configured to switch power on and off to the computing system (e.g., with a digital I/O line) and to reset the computing system in response to an operator command or a fault condition. Additionally, in certain embodiments, a bi-directional serial port connects the computing system to the controller. This bi-directional connection may be used by the controller to receive console debug information from the computing system or to supply console commands. This console data can then be logged to onboard FLASH memory or routed within the controller to be sent over another serial port or over an attached RF modem on a carrier module. In certain embodiments, the console serial lines from the computing system are connected to the core module connector such that an external computer can interface with the computing system console serial port. If an external computer is connected to the console port, a set of resistors gives priority to the data coming from the embedded controller over the data coming from the core module connector. The controller can set the I/O terminals connected to this debug port to be high-impedance, allowing for the external computer to communicate with the core module computing system or it can drive the lines and take priority.

In certain embodiments, additional peripherals from the core module computing system are connected to the core board connector and to the carrier module, such as USB ports, serial ports, audio line-in, line-out ports, and/or other ports. Such peripherals may support interfaces and connections to existing carrier modules and are further capable of supporting yet to be designed carrier modules.

As discussed above, the core module is configured to be connected and adapt to one of various carrier modules (which may be in the form of a populated printed circuit board) which greatly differentiate the capabilities of the completed unit, including the core module and the carrier module(s). Unlike certain conventional autopilot products, where additional hardware inevitably needs to be connected for signal conditioning, power regulation, or radio communication, in certain embodiments such hardware is included and differentiated in the core module and the family of carrier modules so that the appropriate combination of existing modules can be selected by a user without needed to buy and connect additional hardware.

Examples of features that may be differentiated from one carrier module to another include some or all of the following:
  Form Factor
  Weight
  Input Power
  Regulated Power
  Physical Payload Interfaces Electrical Payload Interfaces
Radio Modem
Connectors
GPS
Additional Host Computer
Redundancy By way of illustration, a given carrier module may be designed, with respect to form factor, attachment method, and enclosure type, to meet the mission needs of a small Unmanned Aerial Vehicle (UAV). Further, with respect to input power, different vehicles have access to different sources of power. Some vehicles have batteries only, while others have alternators or fuel cells, and so different carrier modules may be configured to run off different input power. In addition, different vehicles have differing demands on regulated power for attached payloads, and so different carrier modules may be configured to source different output power types/levels. Further, connectors on various carrier types can vary by type, size, and count depending on the vehicle and mission needs that the carrier has been designed for.

An example flight management system may comprise two or more modules connected in a stacked manner without the need for a backplane. In the example illustrated in FIG. 1, an example core module 30c and example carrier module 33c are depicted. The two tightly integrated example electronic modules 30c, 33c connect to each other via a connector 19c on the core module 30c and a mating connector 20c on the carrier module 33c. Other embodiments may include additional connectors between the modules 30c, 33c.

In this example, the core module 30c contains the electronics that are common to flight management systems in a given product series of flight management systems. The carrier module 33c contains the functionality that is desired to be differentiated across a product series. Thus, each flight management system in a given product series will typically contain the same core module 30c design and may vary in the carrier module 33c incorporated. A given version of the carrier module 33c contains electronics that are specific to the form factor, desired size, desired weight, desired operational range, power requirements, and payload interfaces desired for the specific product/application.

Figure 2:
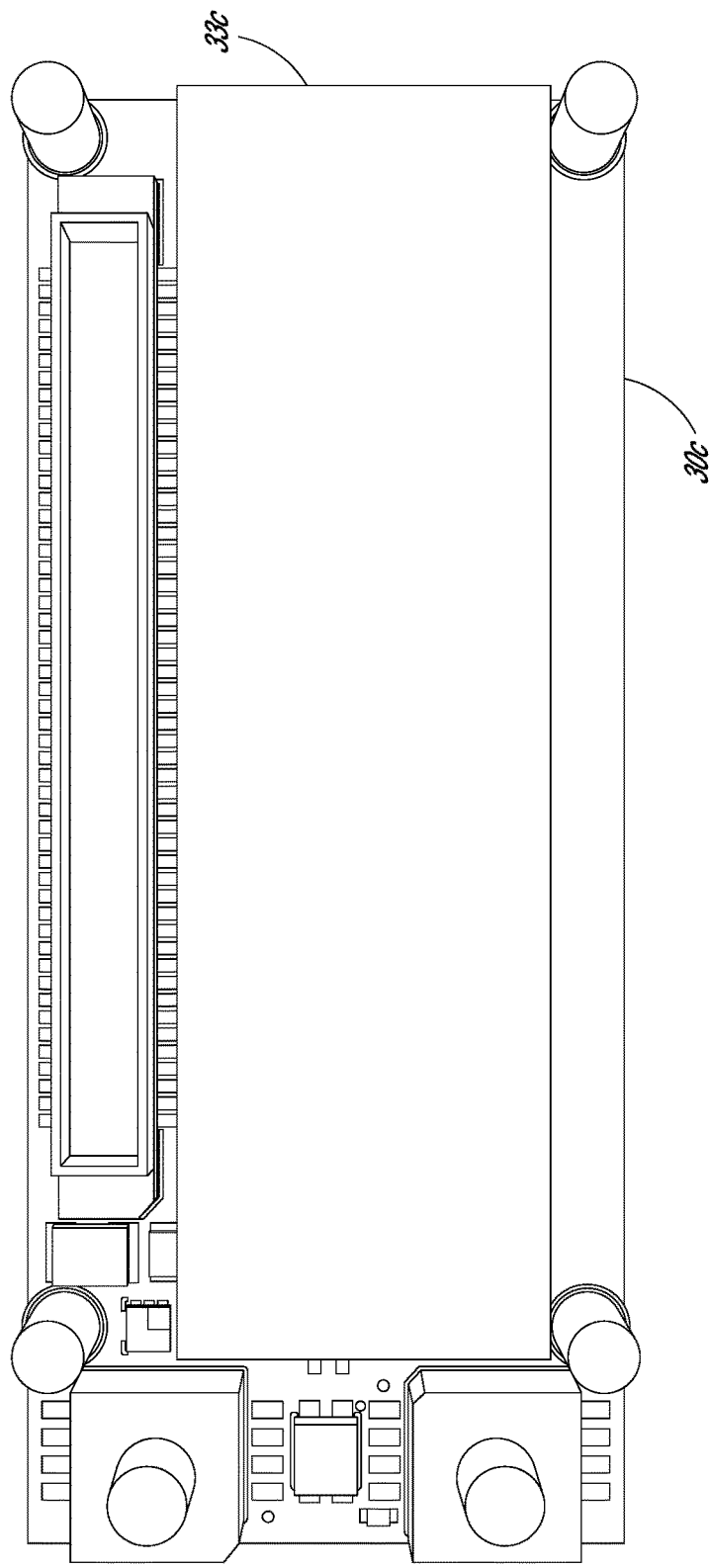
FIG. 2 illustrates an example physical configuration of a core module.

In the example embodiment illustrated in FIG. 1, the core module includes one or more pressure sensors 1c, 2c, a tri-axial gyro 3c, a tri-axial accelerometer 4c, a tri-axial magnetometer 5c, an analog to digital converter 6c, and a computing device or system 7c, which may be, by way of example, a controller (e.g., a microcontroller) and/or a microprocessor. The analog to digital converter 6c converts analog signals from the various sensors to digital signals, which may then be read by the computing device 7c. FIG. 2 illustrates an example embodiment of such a core module. In an example embodiment, the core module may be about 7-15 grams (e.g., 10 grams) and may be about 2-4 inches in one dimension and 0.75 inches-2 inches in another dimension (e.g., 2.65" by 1"). The core module may further include a small form factor computer system 100c, optionally hosting and capable of executing a high level operating system, such as Linux.

A given carrier module 33c may include a radio transceiver 8c, which enables communication with a control station, power conditioning electronics 9c, which regulates electrical power needed for payloads, and carrier/core module components, signal conditioning circuitry 10c, which interfaces the microcontroller 7c with peripherals and actuators, and a GPS receiver 11c, used to determine the vehicles location. In addition or instead, a GPS receiver may be removably connected to the carrier module 33c via a connector. Outputs from and inputs to the foregoing components may be removably connected to the computing device via the connectors 20c and 19c.

Elements which necessitate differentiation from one flight management system product to another may be included within the carrier module 33c. For example, the carrier module 33c may include some or all of the following components: GPS antenna connector 15c (which may be connected to GPS antenna 13c), GPS receiver 11c, radio transceiver 8c, radio transceiver antenna connector 14c (which may be connected to antenna 1c), power conditioning circuitry 9c, signal conditioning circuitry 10c, and interface connectors 21c, 22c. Each of these components may be different on different carrier modules as needed to support different mission types and vehicle types.

Optionally, the carrier module 33c may include a computer system hosting and configured to execute an operating system (e.g., Linux). The computer system on the carrier module 33c may be more powerful (e.g., operate at a higher operating frequency, be capable of performing more operations per second, have a higher performance floating point arithmetic unit, and/or have dedicated graphics processing circuitry) as compared to the computer system on the core module 30c. The computer system of the carrier module 33c may optionally take over host functions from the computer system on the core module 30c. As similarly discussed above, the carrier module 33c may include speaker(s) and/or visual indicators to provide system status to a user, and user interfaces 101c (e.g., buttons, switches, touch screens) configured to receive user inputs. The carrier module 33c may include extended volatile and/or non-volatile accessible by the computing device 7c on the core module 30c. The carrier module 33c may further include a radio control receiver. Optionally, the carrier module 33c may include thermal management hardware such as heat-sinking and temperature sensors. Optionally the carrier module 33c may include mechanical features for mounting the carrier module within an enclosure or high-vibration environment.

Thus, by connecting one carrier module (or more than one carrier module) to a core module, a complete vehicle management system may be created. By connecting different carrier modules to the core module, different vehicle management systems are created, designed to meet respective differing customer needs for integration into different sizes and types of vehicles, and to meet different mission needs.

Examples of form factors, enclosures, weight combinations, input power, output power, and connector configurations are as follows (it being understood that other embodiments may utilize different form factors, enclosures, weight combinations, input power, output power, and connector configurations):

For particularly small UAVs or UAVs with a particularly small volume allocated for the flight management system (e.g., very small fixed wing unmanned aerial vehicles), the carrier module may weigh about 20 grams or less, and have dimensions of about 2.65" by 1.1" by 0.37". To reduce weight and volume, optionally this embodiment does not include a shielding enclosure and can be mounted using one or more screws or other fastening devices which may be the same screws which attach the core module to the carrier module, in order to save weight and size. The flight management system may be configured to run from a battery dedicated to the flight management system with a voltage between 5.5V and 22V, and optionally has no capability of sensing the current draw. The system may be able to source at least 1 Amp of regulated 3.3 VDC power for payloads.

Figure 3:
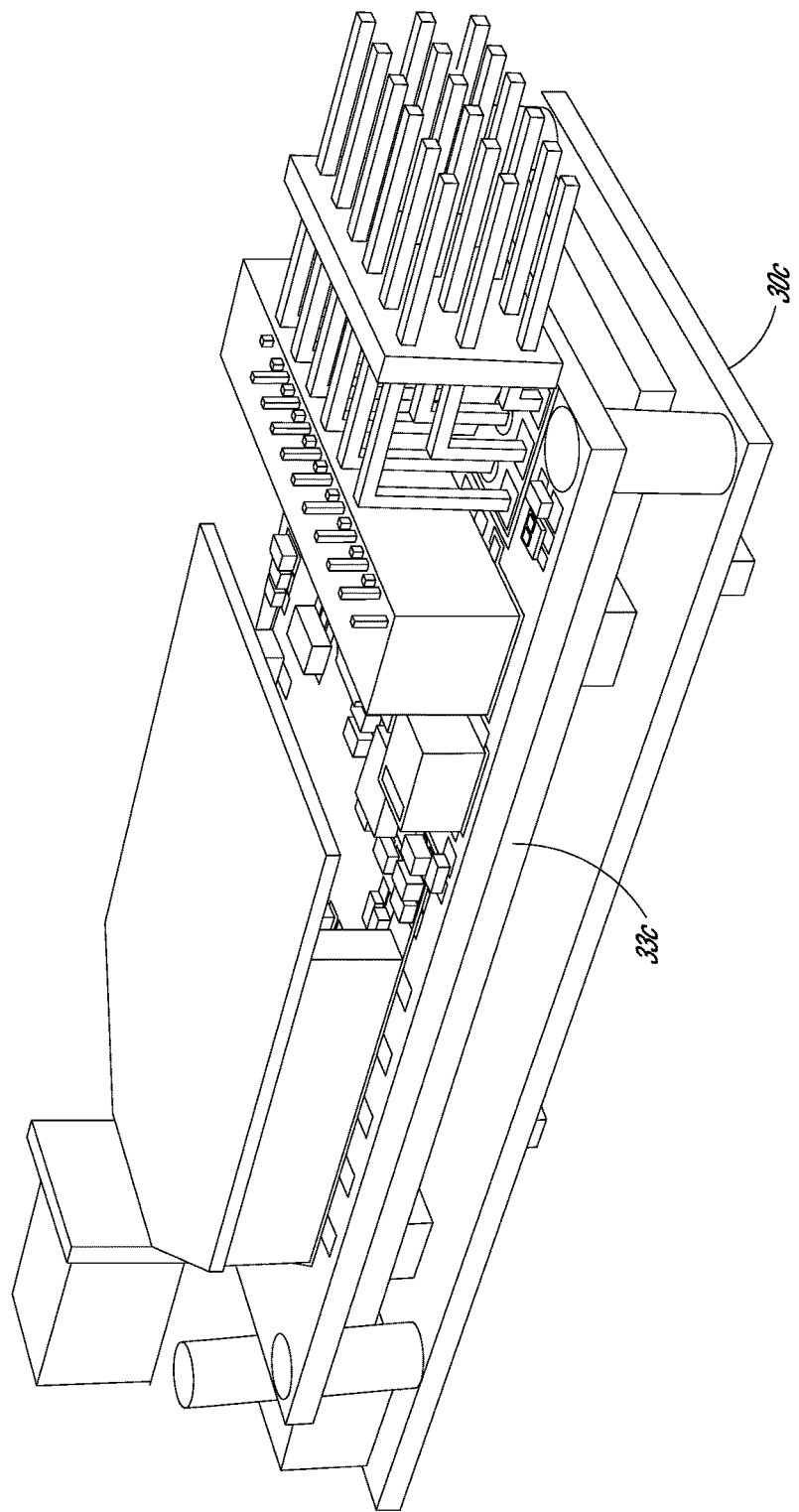
FIGS. 3-5 illustrate example physical configurations of carrier modules.

The carrier module may optionally be configured with low-cost connectors that interface directly with RC servo actuators. In certain embodiments, the carrier module may include two connectors, one that connects to the RC servos and one that is configured to connect to a low-cost ribbon cable. Both connectors may be located at one end of the circuit board. Other embodiments may include fewer or additional connectors located at different areas. To reduce weight and volume, the carrier module may include a relatively less accurate, relatively low-cost embedded GPS receiver. In another embodiment, the low-cost GPS receiver is part of the GPS antenna and is external to the PCB and connected using a connector. FIG. 3 illustrates an example embodiment of such a carrier module.

Figure 4:
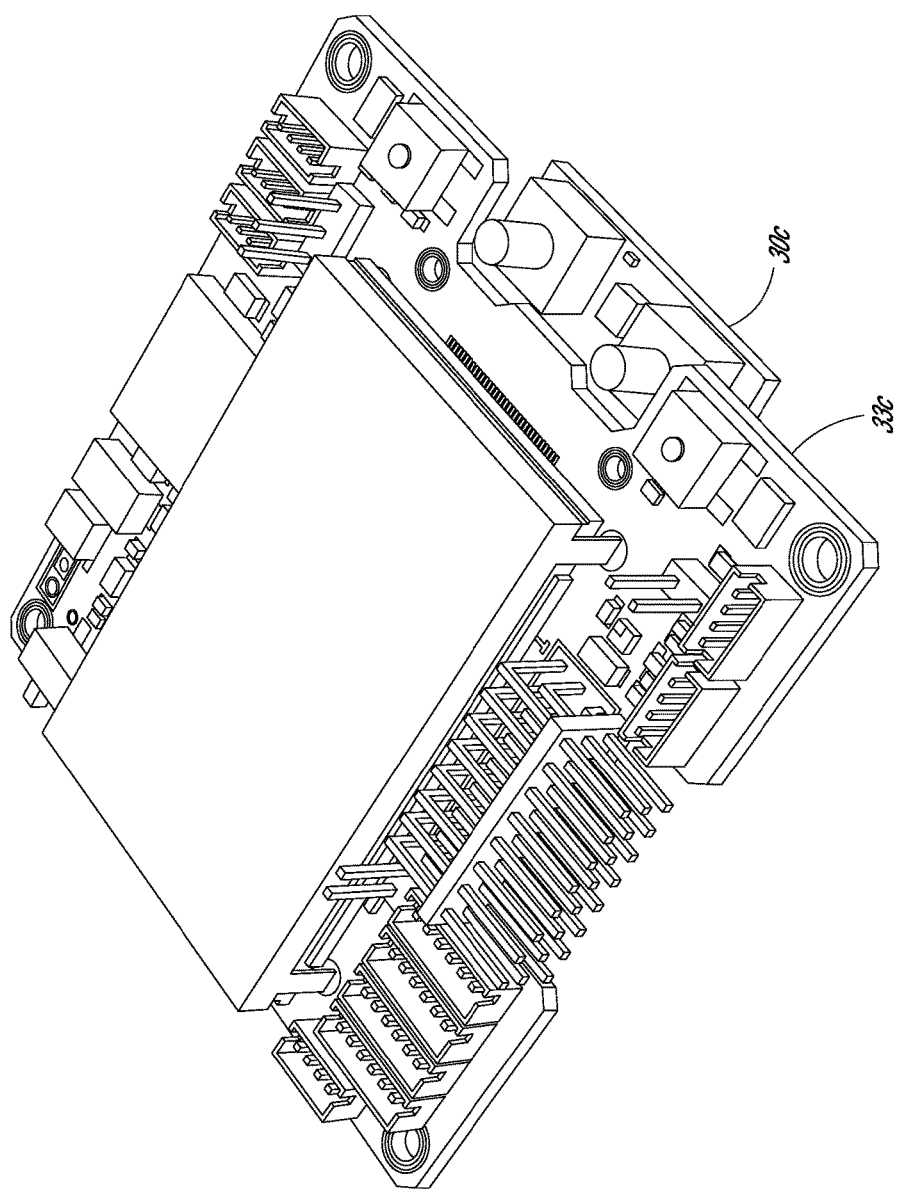

For somewhat larger UAVs or UAVs with somewhat greater volume for the flight management system (e.g., multi-rotor unmanned aerial vehicles), the carrier module may weigh about 48 grams or less, and have dimensions of about 2.65" by 2.65" by 0.42". The total stacking height, including the core module and the carrier module, may be between 0.7 inches to 1 inch (e.g., 0.75"). To reduce weight and volume, optionally this embodiment does not include an enclosure and can be mounted using one or more screws or other fastening devices. The flight management system may be configured to run from a pack of batteries, optionally dedicated to the flight management system or optionally also providing power to other vehicle components, with a voltage between 5.5 VDC and 24 VDC and optionally can measure the current used by the system using an external sensor. The system may be able to source at least 4 Amps of regulated 5 VDC power and 4 Amps of regulated 3.3 VDC power and can turn power on and off to 3.3 VDC and 5 VDC payloads. The carrier module may include multiple (e.g., 12) small, lightweight connectors. To provide enhanced connectivity, the carrier module may have connectors on four sides of the circuit board. In order to further enhance flexibility, the carrier module may utilize a removable, external GPS receiver, enabling different GPS receivers (e.g., military GPS receivers capable of receiving encrypted GPS signals intended for military applications, GPS receivers providing enhanced location accuracy by using carrier phase tracking, standard GPS civilian receivers, etc.) to be selected and connected to the carrier module, so that the carrier module can be adapted with a GPS module with the appropriate accuracy for a desired mission. FIG. 4 illustrates an example embodiment of such a carrier module.

Figure 5:
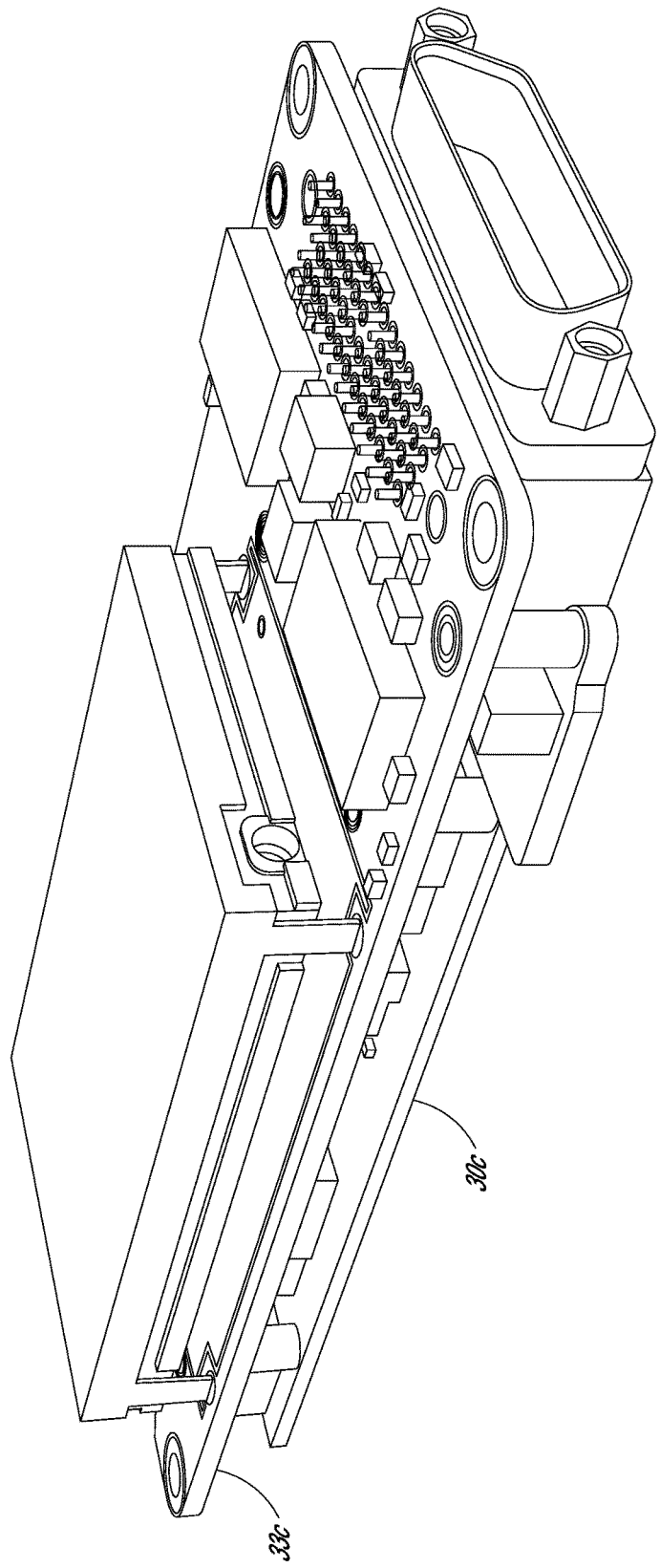

For still larger UAVs or UAVs with still greater volume for the flight management system (e.g., larger fixed wing and helicopter unmanned aerial vehicles), the carrier module may weigh about 200 grams or less, and have dimensions of about 4" by 2.1" by 1.125". The carrier module circuit board may be mounted in a shielded enclosure (e.g., an aluminum enclosure). The flight management system may be configured to run from a pack of batteries dedicated to the flight management system or a vehicle's DC power bus (e.g., a 12V bus, or a 28V bus). Optionally, the flight management system is configured to measure how much current it uses as well as the devices powered by the autopilot. The system may be able to source at least 3 Amps of regulated 5 VDC power and 3 Amps of regulated 3.3 VDC power and can turn power on and off to 3.3 VDC and 5 VDC payloads as well as payloads powered at the input voltage. Optionally, in order to reduce or minimize connections between the flight management system and the vehicle and to enhance reliability, the carrier module may include a single, or more than one connector. Optionally, all the carrier module connectors are on a single face of the enclosure and extend through the enclosure. In order to enhance flexibility, the carrier module may utilize a removable, external GPS receiver, enabling different GPS receivers to be selected and connected to the carrier module, so that the carrier module can be adapted with a GPS module with the appropriate accuracy for a desired mission. FIG. 5 illustrates an example embodiment of such a carrier module.

A given carrier module can include a variety of interfaces, such as one or more of PWM, GPIO, low voltage serial, RS-232, RS-422, RS-485, USB, CAN, I2C, SPI, etc.

A given carrier may support and have a specific radio modem attached to it. By way of example, a given radio modem may be configured for short-range low power operation or for long-range operations. Non-limiting example modems include 900 MHz FHSS, 2.4 GHz FHSS, Zigbee, 802.15.4, 802.11, Digimesh, or other modem type.

For missions that need a computing system with substantially more computational power than that provided by a core module, a larger and more powerful computing system can be included on the carrier module. The carrier module computing system may be connected to the core module via the core module connector (e.g., via a USB interface). The core module is configured to enable the core module controller to be connected to the carrier module computing system so that the controller interacts with the carrier module computing system and treats the carrier module computing system as a host, rather than treating the small form-factor, relatively less powerful computing system on the core module as a host.

Optionally, to provide redundancy, a single carrier module (or multiple carrier modules), may be connected to multiple core modules or a single core module may be coupled to multiple redundant carrier modules (or a single carrier module with redundant subsystems). Optionally, redundant sensors may be incorporated. For example, there may be an odd number of core modules (e.g., three core modules) connected to voting logic. Each core module may perform substantially identical functions and provide respective outputs that are compared by the voting logic. If the outputs of the core modules do not match/disagree, as determined by the voting logic, the output from the non-conforming core module(s) are deactivated or ignored. Thus, the failure of a single core unit will not interrupt the normal operation of the flight management system, enabling the flight management system to continue flying the vehicle. Optionally, two or more core modules may be used, wherein a filter (e.g., a Kalman filter) is used to detect a failure of a component (e.g., a MEMs inertial sensor) by detecting excessively high filter residuals, where the flight management system is configured to inhibit the use of data from a detected failed sensor for controlling the flight of the vehicle, or a voting scheme is implemented which uses the median sensor values from three or more core modules and/or the median controller outputs. The carrier module may also include redundant power supplies and/or redundant GPS receivers.

Certain example interaction processes between a core module and a carrier module will now be described.

A user may power up the flight management system, including a core module and at least one carrier module (or only a single carrier module). After power-up, the core module interrogates the carrier module to determine the carrier module type/version and its capabilities, and to authentic the carrier module as being for an approved source/manufacturer. This interrogation and the subsequent reply may occur over a single IO line using asynchronous encrypted serial communication or over a multiline bus using asynchronous or synchronous encrypted communication.

In an example embodiment, a given carrier module may include a capabilities circuit, such as a microcontroller, as similarly discussed above. The capabilities circuit may be connected to the core module controller module via an I/O line (e.g., an ID line). Different carrier modules (including different types of carrier modules) may utilize the same capabilities circuit with substantially the same firmware, differing in identifying stored data (which may be stored as one or more bytes of data) which are particular to the respective carrier module. The identifying stored data may include some or all of the following information:

the type of carrier module;

the carrier module serial number; and additional information specific to the type of carrier module.

For example, if the carrier module includes a radio modem, the additional information may identify what type of radio modem is attached. Additionally, if the carrier module has a serial payload interface, the additional information may identify what type of serial driver is populated (e.g., RS-232 or RS-485). Capabilities information may indicate what connectors are presented on the carrier module, which of the connectors are connected to an external device, what type of signal condition is being used on the carrier module, which ports are being used, etc.

After power is applied to the flight management system, the capabilities circuit configures the ID line as an input and waits for a transition from low to high. In an example embodiment, once this transition occurs, asynchronous serial data with inverted polarity, one start bit, one stop bit, and 8 data bits is transmitted from the core module controller to the capabilities circuit on the carrier module (although other data formats may be used). This serial data includes a random or pseudo-random 64-bit challenge word. The capabilities circuit receives this challenge word, encrypts it with a 64-bit key, and issues a response including this encrypted challenge key and additional data also encrypted with the key (although other encryption techniques may be used). This additional information may include the data bytes that differ from one capabilities circuit to another including the carrier type, serial number, and additional carrier capabilities.

When the encrypted data is received by the core module microcontroller, the data is decrypted using the same 64-bit key. If the decrypted challenge word matches the original challenge word, the carrier module is determined to be an authentic carrier module. If the challenge word is a match and the core module is authenticated, the core module continues its boot process and begins executing the main firmware. The core module stores the additional data received from the carrier module including the type of carrier and the additional capabilities options. Other authentication techniques may be used as well. Optionally, if the carrier module is not authenticated, the core module reports an authentication failure (e.g., by illuminating a failure light, emitting a failure sound/speech, transmitting a failure indication to a remote system, etc.), halts the boot process and/or halts execution of software which enables flight (e.g., to halt activation of propulsion units and/or placement of control surfaces for flight).

The firmware may include control branches which are executed based on the stored capabilities of the carrier and the type of carrier. For example, based on the stored capabilities, the core module may configure respective I/O signal lines connected to the core module connector (going to the carrier module) as digital outputs, digital inputs, analog inputs, serial inputs/outputs, or other signal line type, as appropriate for the carrier module. This enables the core module to adapt to and properly interact with the carrier module, without damaging the carrier module, the core module, or the vehicle.

Similarly, an initialization routine may be provided for each type of radio modem or GPS receiver which may be attached to a carrier module. By interrogating the carrier module, the core module can select the proper initialization routine to be run.

Figure 6:
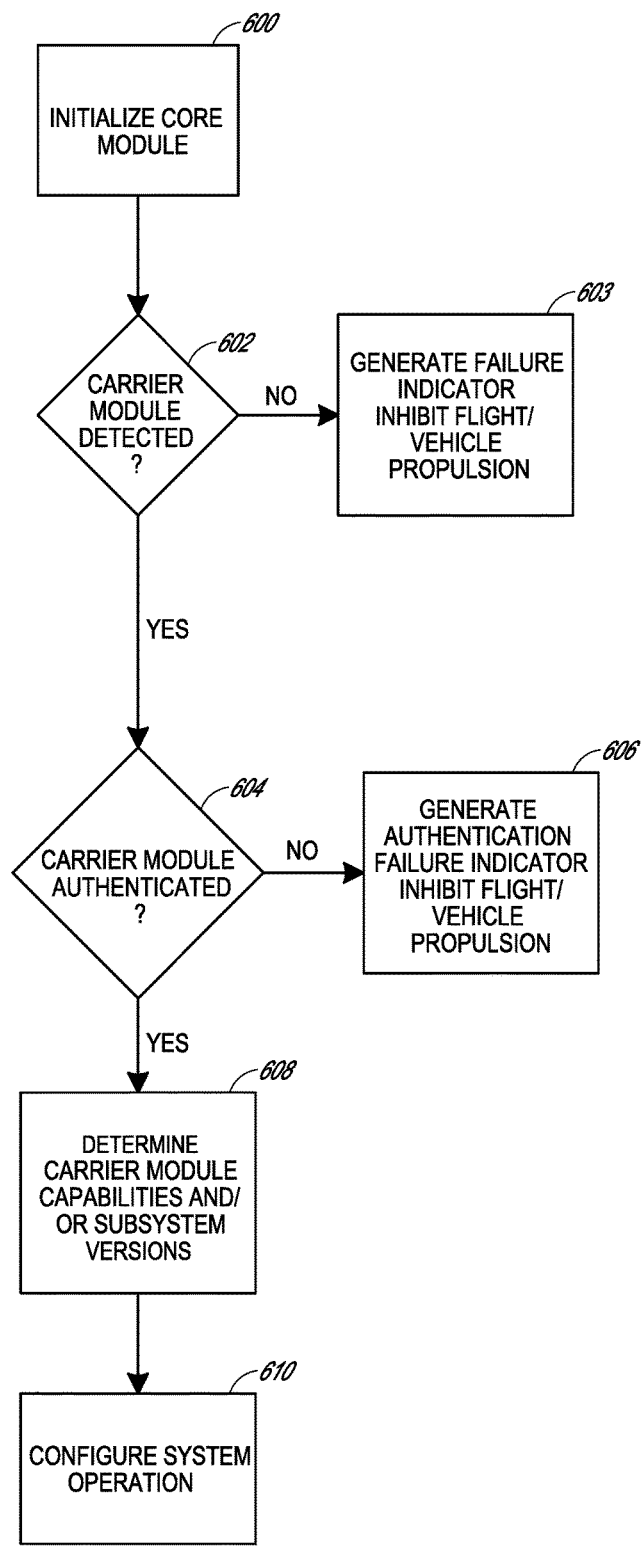
FIG. 6 illustrates an example initialization and interrogation process.

FIG. 6 illustrates an example initialization and interrogation process of a vehicle management system. At state 600, the core module is initialized. The core module may be initialized by the application of power to the core module, a power-on reset signal, a user activation of a dedicated reset control (e.g., a reset button or switch), an initialization instruction from an external system, or otherwise. At state 602, the core module determines whether a carrier module is present. If a carrier module is not detected, then at state 603, a failure routine is executed and a failure indication is generated. The failure indication may be provided via a visual indicator (e.g., a red LED), a sound (e.g., provided via a core module speaker if one is present), and/or a data transmission to another system. Operation of the vehicle is inhibited as further execution of software which enables flight does not occur.

If the core module detects a carrier module, the process proceeds from state 602 to state 604 and an authentication process is performed to determine/verify whether the carrier module is from an authorized source and is authorized for use with the core module. Optionally, the authentication process discussed above may be utilized. If the carrier module authentication process indicates that the carrier module failed authentication, then the process proceeds to state 606, and a failure routine is executed and an authentication failure indication is generated. The failure indication may be provided via a visual indicator (e.g., a red LED), a sound (e.g., provided via a core module speaker if one is present), and/or a data transmission to another system. Operation of the vehicle may be inhibited.

If the carrier module is authenticated, the process proceeds from state 604 to state 608, and the core module interrogates the carrier module, and determines the configuration of the carrier module, including the capabilities of the carrier module and/or the versions of one or more carrier module subsystems. For example, the core module may determine what, if any, payload interface(s), radio modem, satellite navigation system(s), auxiliary host computer(s), redundant system(s), etc., the carrier module is configured with and/or which version of the foregoing the carrier module is configured with. The core module may store such configuration in local memory. At state 610, the core module configures its operation to adapt to and correspond with the carrier module configuration. The vehicle management system may now begin operating its autopilot and/or other functions to navigate the vehicle.

Thus, a modular vehicle management system is described which enables a core module to be connected to a carrier module selected from a family of carrier modules to thereby provide a vehicle management system appropriate for a given vehicle and mission.

The systems and methods disclosed herein can be implemented in hardware, software, firmware, or a combination thereof. Software can include computer readable instructions stored in memory (e.g., non-transitory, tangible memory, such as solid state memory (e.g., ROM, EEPROM, FLASH, RAM), optical memory (e.g., a CD, DVD, Bluray disc, etc.), magnetic memory (e.g., a hard disc drive), etc., configured to implement the algorithms on a general purpose computer, special purpose processors, or combinations thereof. For example, one or more computing devices, such as a processor, may execute program instructions stored in computer readable memory to carry out processed disclosed herein. Hardware may include state machines, one or more general purpose computers, and/or one or more special purpose processors.

While certain embodiments may be illustrated or discussed as having certain example functions, components and interfaces, additional, fewer, or different functions, components and interfaces may be utilized. Further, with respect to the processes discussed herein, various states may be performed in a different order, not all states are required to be reached, and fewer, additional, or different states may be utilized.

What is claimed is:

1. A modular flight management system for an unmanned vehicle, comprising:
 a controller board configured to control a plurality of different types of carrier boards of different configurations, the controller board including at least, on the same controller board:
 computer readable media,
 a pressure sensor coupled to the controller board,
 a gyroscope coupled to the controller board,
 an accelerometer coupled to the controller board, and
 a first computer system configured to execute a first operating system, wherein the first computer system is configured to perform the operations comprising:
  storing in the computer readable media a carrier board configuration, the carrier board configuration comprising configuration information associated with at least one of a radio modem, satellite navigation system, auxiliary host computer, or redundant system,
  receiving signals from the pressure sensor, gyroscope and accelerometer,
  based at least in part on the received signals, navigating the unmanned vehicle in accordance with a desired location or route, and
  adapting one or more of inputs or outputs associated with signal lines of the controller board based on the carrier board configuration, wherein the inputs or outputs are configured to be digital or analog based on the carrier module configuration; and
 a controller board enclosure;
 a connector configured to receive a carrier board for the unmanned vehicle, wherein signals lines associated with the connector are adapted based on the carrier board configuration; and
 an operating system board configured for operation with the controller board, the operating system board comprising:
 a second computer system configured to execute a second operating system,
 wherein the second computer system has more computational power than the first computer system, and
 wherein the second computer system is configured to perform operations separate from the first computer system.

2. The modular flight management system as defined in claim 1, wherein the first computer system is further configured to perform the operations comprising:
 detecting whether the carrier board is connected to the connector;
 at least partly in response to detecting that the carrier board is connected to the connector, authenticating the detected carrier board to determine whether the detected carrier board is authorized to be connected to the controller board, and
 wherein if the detected carrier board fails authentication by the controller board, flight of the unmanned vehicle is inhibited by the modular flight management system.

3. The modular flight management system as defined in claim 2, wherein authenticating the detected carrier board to determine whether the detected carrier board is authorized to be connected to the controller board further comprises transmitting a random or pseudo-random challenge word to the detected carrier board and receiving an encrypted challenge response from the detected carrier board, the challenge response including information indicating capabilities of the detected carrier board.

4. The modular flight management system as defined in claim 1, wherein the first computer system is further configured to perform the operations comprising:
 determining whether a failure condition exists, and
 inhibiting flight of the unmanned vehicle if a failure condition is determined.

5. The modular flight management system as defined in claim 1, wherein the first computer system is further configured to perform the operations comprising:
 estimating a current state of the unmanned vehicle, the estimated state comprising position, attitude, heading, altitude, airspeed and velocity.

6. The modular flight management system as defined in claim 1, wherein the modular flight management system is further configured to perform the operations comprising:
 maintaining or altering a course of the unmanned vehicle; and
 controlling actuators to control movement of the unmanned vehicle.

7. The modular flight management system as defined in claim 1, wherein the modular flight management system is further configured to perform the operations comprising:
 pointing and focusing a camera, and
 instructing the camera to capture images.

8. The modular flight management system as defined in claim 1, wherein the different types of carrier boards comprise a carrier board having one or more temperature sensors configured to measure air temperature of an interior of the controller board enclosure.

9. The modular flight management system as defined in claim 1, wherein the modular flight management system is further configured to perform the operations comprising:
 interrogating a carrier board included in the different types of carrier boards, and based at least in part on results of the carrier board interrogation, selecting an initialization routine to run for the interrogated carrier board.

10. The modular flight management system as defined in claim 1, wherein the different types of carrier boards comprise a carrier board that comprises a radio modem and a navigation satellite system signal processing device.

11. The modular flight management system as defined in claim 1, wherein the different types of carrier boards comprise a carrier board, comprising a radio modem, a navigation satellite system signal processing device, a power supply configured to power one or more actuator servos, and a servo interface configured to control the one or more actuator servos to control a flight control surface or propulsion system of the unmanned vehicle.

12. The modular flight management system as defined in claim 1, wherein the first computer system is further configured to perform the operations comprising:
determining information regarding payload interfaces on the carrier board.

13. The modular flight management system as defined in claim 1, wherein the first computer system is further configured to perform the operations comprising:
obtaining information regarding signal conditioning on the carrier board.

14. The modular flight management system as defined in claim 1, further comprising:
a plurality of controller modules, corresponding to an odd number of redundant controller modules; and
a voting circuit configured to receive outputs from the odd number of redundant controller modules, wherein the voting circuit is configured to determine if a first of the odd number of redundant controller modules is providing an output that fails to correspond to outputs provided by at least two other redundant controller modules, and at least partly in response to determining that the first of the odd number of redundant controller modules is providing an output that fails to correspond to outputs provided by that at least two other redundant controller modules, inhibiting operation of the first of the odd number of redundant controller modules.

15. The modular flight management system as defined in claim 1, further comprising:
a plurality of sensors; and
a Kalman filter configured to detect failure of a sensor of the plurality of sensors, wherein the modular flight management system is configured to inhibit the use of data from a detected failed sensor for control of flight of the unmanned vehicle.

16. The modular flight management system as defined in claim 1, further comprising:
a plurality of controller modules; and
a voting circuit configured to detect a failed controller module using median sensor values, or median controller outputs, or median sensor values and median controller outputs, from three or more controller modules.

17. A modular flight management system for navigating an unmanned vehicle, the system comprising:
a controller board configured to control a plurality of different types of carrier modules of different configurations, the controller board including at least, on the same controller board:
computer readable media,
a pressure sensor coupled to the controller board,
a gyroscope coupled to the controller board,
an accelerometer coupled to the controller board, and
a first computer system configured to execute a first operating system, wherein the first computer system is configured to perform the operations comprising:
detecting whether one or more carrier modules are coupled to the controller board,
storing in the computer readable media a carrier module configuration based on the detected carrier modules, a carrier board configuration comprising configuration information associated with at least one of a radio modem, satellite navigation system, auxiliary host computer, or redundant system,
interrogating the one or more carrier modules,
based on the interrogation, selecting an initialization routine to run for the one or more carrier modules,
adapting one or more of inputs or outputs associated with signal lines of the controller board based on the carrier module configuration, wherein the inputs or outputs are configured to be digital or analog based on the carrier module configuration,
receiving signals from the pressure sensor, gyroscope and accelerometer, and
based at least in part on the received signals, navigating the unmanned vehicle in accordance with a desired location or route.

18. The modular flight management system as defined in claim 17, wherein the first computer system is further configured to perform the operations comprising:
at least partly in response to detecting that a first carrier module is connected to the controller board, authenticating the first carrier module to determine whether the first carrier module is authorized to be connected to the controller board; and
wherein if the first carrier module fails authentication by the controller board, flight of the unmanned vehicle is inhibited by the modular flight management system.

19. The modular flight management system as defined in claim 17, wherein the first computer system is further configured to perform the operations comprising:
determining whether a failure condition exists, and inhibiting flight of the unmanned vehicle if a failure condition is determined.

20. A method of operating an unmanned vehicle, the method comprising:
detecting, by a flight management system comprising a computer system, whether a carrier module is connected to a controller board;
storing in a computer readable media a carrier module configuration based on the detected connected carrier module, carrier module configuration comprising configuration information associated with at least one of a radio modem, satellite navigation system, auxiliary host computer, or redundant system;
interrogating, by the flight management system, the carrier module;
based on the interrogation, selecting, by the flight management system, an initialization routine to run for the carrier module;
adapting one or more of inputs or outputs associated with signal lines of the controller board based on the carrier module configuration, wherein the inputs or outputs are configured to be digital or analog based on the carrier module configuration; and
automatically piloting the unmanned vehicle in accordance with a desired location or route.

21. The method of claim 20, further comprising:
at least partly in response to detecting that a second carrier module is connected to the controller board, authenticating the second carrier module to determine whether the second carrier module is authorized to be connected to the controller board; and
wherein if the second carrier module fails authentication by the controller board, flight of the unmanned vehicle is inhibited by the flight management system.

22. The method of claim 20, further comprising:
determining whether a failure condition exists, and inhibiting flight of the unmanned vehicle if a failure condition is determined.

23. The method of claim 20, further comprising:
estimating a current state of the unmanned vehicle, the estimated state comprising position, attitude, heading, altitude, airspeed and velocity.

24. The method of claim 20, further comprising:
maintaining or altering a course of the unmanned vehicle; and
controlling actuators to control movement of the unmanned vehicle.

25. The method of claim 20, further comprising:
pointing and focusing a camera, and
instructing the camera to capture images.

26. The method of claim 20, further comprising:
determining information regarding payload interfaces on the carrier module.

27. The method of claim 20, further comprising:
obtaining information regarding signal conditioning on the carrier module.

28. A modular flight management system for operating an unmanned vehicle, the system comprising:
a controller board configured to control a plurality of different types of carrier modules, the controller board comprising:
computer readable media,
a pressure sensor coupled to the controller board,
a gyroscope coupled to the controller board,
an accelerometer coupled to the controller board, and
a first computer system configured to execute a first operating system, wherein the first computer system is configured to perform the operations comprising:
storing in the computer readable media a carrier module configuration of coupled carrier modules, the stored carrier module configuration comprising configuration information associated with at least one of a radio modem, satellite navigation system, auxiliary host computer, or redundant system,
adapting one or more of inputs or outputs associated with signal lines of the controller board based on the stored carrier module configuration, wherein the inputs or outputs are configured to be digital or analog based on the carrier module configuration and
determining whether a failure condition exists,
inhibiting flight of the unmanned vehicle if a failure condition is determined;
and
a connector configured to receive a carrier module for the unmanned vehicle; and
an operating system board configured for operation with the controller board, the operating system board comprising:
a second computer system configured to execute a second operating system,
wherein the second computer system has more computational power than the first computer system and has dedicated graphics processing circuitry, and
wherein the second computer system is configured to perform operations separate from the first computer system.

* * * * *